United States Patent Office 2,909,578
Patented Oct. 20, 1959

2,909,578

HYDROGENATION OF ACETYLENE

Holger C. Andersen, Morristown, and Alfred J. Haley, Jr., Hillside, N.J., assignors to Engelhard Industries, Inc., a corporation of New Jersey No Drawing. Application April 26, 1957
Serial No. 655,169

6 Claims. (Cl. 260—677)

This invention relates to the removal of acetylene from hydrocarbon streams, and more particularly to the removal of acetylene from hydrocarbon streams containing substantial quantities of hydrogen.

In application Serial Number 488,972, filed February 17, 1955, now abandoned there is disclosed a process for the selective hydrogenation of acetylene in which the acetylene is present in admixture with other gases, the hydrogenation being effected by the use of a palladium on activated alumina catalyst. It is disclosed in the pending application, supra, that the palladium catalyst has been found to be practically inactive for the hydrogenation of olefins while being active for the hydrogenation of alkynes.

The process of the pending application, supra, finds particular application in the hydrogenation of acetylene in admixture with other gases where relatively small quantities of hydrogen are present, and the palladium content of the catalyst is in the range of about 0.035 to about 0.0015 percent of the total catalyst weight.

For the removal of acetylene from hydrocarbon streams, it is customary to hydrogenate the acetylene to ethylene or ethane, either of which is unobjectionable in many industrial processes, and specifically, such purification is almost always required in the manfacture of ethylene. The most common process for manufacturing ethylene is to crack saturated hydrocarbons, such as ethane, propane or naphtha, and the resulting product is a mixture of unsaturated and saturated hydrocarbons and hydrogen. After the removal of the more readily condensible constituents, the stream may be designated as a modified cracked gas.

It is desirable in some cases to remove acetylene from the modified cracked gas rather than from the relatively pure ethylene eventually isolated from such a stream, but special problems are presented by the presence of large quantities of hydrogen in the modified cracked gas.

Contacting such a gas with a hydrogenation catalyst may result in not only converting acetylene to more saturated products, but also in the conversion of the olefins to paraffins.

In accordance with the present invention, it has been found that a catalyst containing a very low concentration of palladium metal on activated alumina is effective in catalyzing the hydrogenation of the acetylene present in a modified cracked gas without resulting in appreciable loss of ethylene, i.e., the low palladium content catalyst is selective for the hydrogenation of acetylene even in the presence of large quantities of hydrogen.

The catalyst of the invention comprises palladium metal supported on activated alumina, the palladium metal constituting about 0.00001 to 0.0014 percent of the total catalyst weight, and a palladium metal content of about 0.0001 percent of the total catalyst weight is preferred.

The catalyst of the invention may be produced by contacting palladium compounds, for example the sodium salt of tetrachloropalladic acid in aqueous solution with a supporting carrier of a solid dehydrated activated oxide of aluminum in such a manner that the palladium compound hydrolyzes and forms a firm adherent deposit of palladium oxide or hydroxide on the surface of the carrier, the oxide so formed being subsequently reduced to catalytically active palladium metal.

The reaction temperature may be in the range of about 0° C. to 250° C., and the pressure may be in the range of about 0 to 500 p.s.i.g. The space velocity may be in the range of about 1,000 to 20,000 standard volumes of gas per volume of catalyst per hour.

The catalyst may be regenerated by heating in air at a temperature in the range of 350 to 550° C., without substantial effect on the selectivity of the catalyst.

The invention will be further illustrated by reference to the following specific example.

EXAMPLE 1

A series of runs was made using a catalyst consisting of 0.0001 percent palladium on ⅛" activated alumina pellets. The catalyst was placed in a small stainless steel reactor, and a gas mixture containing, by volume, 0.5 percent acetylene, 15 percent hydrogen, 26 percent ethylene, 45 percent ethane, and 14 percent propylene was passed over 15 grams of the catalyst at a flow rate of 75 liters per hour and at a pressure of 150 p.s.i.g. After a short initial "seasoning" period, downstream acetylene analyses showed 1 to 5 p.p.m., while the hydrogen consumption was only about 1.2 percent by volume in the temperature range of 61 to 77° C. The hydrogen consumption is indicative of the olefin consumption. Decreasing the temperature below this range resulted in an excessive quantity of acetylene passing through the catalyst unconverted, whereas higher temperatures resulted in excessive hydrogen consumption.

The results of these runs are summarized in the table below, together with the results of similar runs made using different quantities of palladium on activated alumina, and also runs using activated alumina alone, and it will be seen that activated alumina alone does not result in acetylene removal to the desirable range of 10 p.p.m., or less, and while those catalysts having palladium concentrations in the range of 0.0003 to 0.00125 percent by weight are operable, they promote excessive olefin hydrogenation. The catalyst having 0.0001 percent by weight palladium is selective and also does not result in excessive olefin hydrogenation.

Table I

REMOVAL OF ACETYLENE BY CATALYTIC HYDROGENATION IN SIMULATED CRACKED GAS AT ELEVATED PRESSURE (5,000 HOUR$^{-1}$)

| Catalyst | Pressure, p.s.i.g. | Temp., °C., inlet | Composition, vol. percent | | | | | H₂ out, percent | C₂H₂ out, p.p.m. | General conclusions |
| --- | --- | --- | --- | --- | --- | --- | --- | --- | --- | --- |
| | | | C₂H₂ | C₂H₄ | C₂H₆ | C₃H₆ | H₂ | | | |
| 0.005% Pd on alumina | 15 | 139 | 0.5 | 40 | 45 | | 15 | 0.7 | 0 | |
| | 120 | 145 | 0.5 | 40 | 37 | 8 | 15 | 2.0 | 8 | |
| | 175 | 151 | 0.5 | 40 | 37 | 8 | 15 | 0.3 | 10 | |
| | 15 | 150 | 0.5 | 40 | 37 | 8 | 15 | 9.9 | 24 | Not selective. |
| 0.00125% Pd on alumina | 150 | 150 | 0.5 | 40 | 45 | 0 | 15 | 0.0 | 3 | |
| | | 190 | 0.5 | 40 | 45 | 0 | 15 | 0.6 | 3 | |
| | | 85 | 0.5 | 40 | 45 | 0 | 15 | 0.9 | 3 | |
| | | 76 | 0.5 | 40 | 45 | 0 | 15 | 1.8 | | |
| | | 96 | 0.5 | 40 | 45 | 0 | 15 | 2.3 | 2 | Too active. |
| 0.00032% Pd on alumina | 150 | 150 | | | | | | 0.0 | 3 | |
| | | 75 | | | | | | 7.9 | 4 | |
| | | 63 | | | | | | 11.2 | 130 | |
| | | 66 | | | | | | 11.7 | 88 | Not selective. |
| 0.0001% Pd on alumina | 150 | 75 | | | | | | 6.5 | 5 | |
| | | 94 | 0.5 | 26 | 45 | 14 | 15 | 0.0 | 2 | |
| | | 52 | | | | | 15 | 14.7 | 1,290 | |
| | | 71 | | | | | | 13.4 | 1 | |
| | | 69 | | | | | | 13.7 | 2 | Selective. |
| Plain alumina | 150 | 123 | 0.5 | 40 | 45 | 0 | 15 | 15.0 | 4,500 | |
| | | 149 | | | | | | 15.0 | 1,800 | |
| | | 171 | | | | | | 14.4 | 430 | |
| | | 189 | | | | | | 14.1 | 130 | |

It will be obvious to those skilled in the art that many modifications may be made within the scope of the present invention without departing from the spirit thereof, and the invention includes all such modifications.

What is claimed is:

1. A catalyst for the selective hydrogenation of acetylene comprising palladium metal supported on activated alumina, the palladium metal constituting about 0.00001 to 0.0014 percent of the total catalyst weight.

2. A catalyst for the selective hydrogenation of acetylene comprising palladium metal supported on activated alumina, the palladium metal constituting about 0.0001 percent of the total catalyst weight.

3. A process for selectively hydrogenating acetylene in a gaseous mixture containing saturated and unsaturated hydrocarbons and hydrogen which comprises passing the gaseous mixture at elevated temperature and pressure conditions over a catalyst comprising palladium metal supported on activated alumina, the palladium metal constituting about 0.00001 to 0.0014 percent of the total catalyst weight.

4. A process for selectively hydrogenating acetylene in a gaseous mixture containing saturated and unsaturated hydrocarbons and hydrogen which comprises passing the gaseous mixture at elevated temperature and pressure conditions over a catalyst comprising palladium metal supported on activated alumina, the palladium metal constituting about 0.0001 percent of the total catalyst weight.

5. A process for selectively hydrogenating acetylene in a modified cracked gas which comprises passing the modified cracked gas at elevated temperature and pressure conditions over a catalyst comprising palladium metal supported on activated alumina, the palladium metal constituting about 0.00001 to 0.0014 percent of the total catalyst weight.

6. A process for selectively hydrogenating acetylene in a modified cracked gas which comprises passing the modified cracked gas at elevated temperature and pressure conditions over a catalyst comprising palladium metal supported on activated alumina, the palladium metal constituting about 0.0001 percent of the total catalyst weight.

References Cited in the file of this patent

UNITED STATES PATENTS

| | | |
| --- | --- | --- |
| 1,860,624 | Sauerwein | May 31, 1932 |
| 2,475,155 | Rosenblatt | July 5, 1949 |
| 2,802,889 | Frevel et al. | Aug. 13, 1957 |